United States Patent
Tseng (10) Patent No.: US 8,279,914 B2
(45) Date of Patent: Oct. 2, 2012

(54) SNR ESTIMATION SYSTEM FOR MULTI-CARRIER COMMUNICATION

(75) Inventor: Chun-Chieh Tseng, Gueishan Township, Taoyuan County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 392 days.

(21) Appl. No.: 12/656,924

(22) Filed: Feb. 19, 2010

(65) Prior Publication Data
US 2010/0303140 A1   Dec. 2, 2010

(30) Foreign Application Priority Data
Jun. 2, 2009  (TW) ............................... 98118181 A (51) Int. Cl.
*H04B 17/00* (2006.01)

(52) U.S. Cl. ........ 375/227; 375/316; 375/260; 375/261; 375/259

(58) Field of Classification Search .................. 375/227, 375/316, 260, 261, 259
See application file for complete search history.

(56) References Cited

U.S. PATENT DOCUMENTS

| | | | | |
|---|---|---|---|---|
| 6,456,653 B1 * | 9/2002 | Sayeed | ........................ | 375/227 |
| 7,260,054 B2 * | 8/2007 | Olszewski | .................... | 370/208 |
| 7,724,849 B2 * | 5/2010 | Ling et al. | .................... | 375/346 |
| 7,773,681 B2 * | 8/2010 | Koo et al. | .................... | 375/260 |
| 8,094,736 B2 * | 1/2012 | Fu | ................... | 375/260 |
| 8,135,079 B2 * | 3/2012 | Park et al. | .................... | 375/260 |

* cited by examiner

*Primary Examiner* — Siu Lee
(74) *Attorney, Agent, or Firm* — Bacon & Thomas, PLLC (57) ABSTRACT

A signal to noise power ratio estimation system for multi-carrier communication includes a phase rotator, a power estimator, a channel gain calculator, an average and selection device, a combination and calculation device and a decibel (dB) transformation device. The signal to noise power ratio estimation system makes use of a transmit parameter signaling or pilot subcarriers to blindly assist in the signal to noise power ratio estimation to accordingly gain an estimated signal to noise power ratio accurately, and thus a communication system can be calibrated to a preferred condition.

21 Claims, 9 Drawing Sheets

| Point number | 1 | 2 | 3 | 4 | 5 | 6 |
|---|---|---|---|---|---|---|
| Delay | -1.8 | 0.0 | 0.15 | 1.8 | 5.7 | 30 |
| Fading (dB) | -18 | 0 | -20 | -20 | -10 | 0 |
| Phase (degree) | 0 | 0 | 0 | 0 | 0 | 0 |

FIG. 10

SNR ESTIMATION SYSTEM FOR MULTI-CARRIER COMMUNICATION

BACKGROUND OF THE INVENTION

1. Field of the Invention

The present invention relates to the technical field of signal transmission and, more particularly, to a signal to noise power ratio (SNR) estimation system for multi-carrier communication.

2. Description of Related Art

An efficient and accurate SNR estimation is necessary for a communication system (e.g. an orthogonal frequency division multiplexing (OFDM) based or a time domain synchronous-orthogonal frequency division multiplexing (TDS-OFDM) based multi-carrier system). Usually, these systems require information of efficient and accurate SNR to improve system performance.

An SNR estimation is disclosed in Xu et. al., 2005, "A Novel SNR Estimation Algorithm for OFDM", IEEE 61-st Vehicular Technology Conference, and accordingly a two-stage SNR estimation is proposed. The two-stage SNR estimation is based on Jakes model and suitable for a rapid multi-path fading channel environment.

An SNR estimation in HIPERLAN is disclosed by Athanasios et. al., 2005, "BPSK SNR estimation algorithm for HIPERLAN/2 transceiver in AWGN channels", ICACT 7-th International Conference on Advanced Communication Technology. However, the SNR estimation in that disclosure merely considers the AWGN (Additive White Gaussian Noise) channels, instead of multi-path channel that is closer to most of practical situations.

Therefore, it is desirable to provide an improved SNR estimation to mitigate and/or obviate the aforementioned problems.

SUMMARY OF THE INVENTION

The object of the present invention is to provide a signal to noise power ratio (SNR) estimation system in multi-carrier communication, which is suitable for an orthogonal frequency division multiplexing (OFDM) based or a time domain synchronous-orthogonal frequency division multiplexing (TDS-OFDM) based multi-carrier system operated under multi-path fading channel.

To achieve the object, a general signal to noise power ratio (SNR) estimation system for multi-carrier communication is provided, that does not require detect in advance the content of transmit parameter signaling (TPS) symbols or pilot sub-carriers. The estimation system includes a phase rotator, a power estimator, a channel gain calculator, an average and selection device, and a combination and calculation device. The phase rotator receives a quadrature amplitude modulation (QAM) symbol and a channel estimation signal and performs a phase rotation on the symbol and signal to thereby generate a rotated QAM symbol and a rotated channel estimation signal. The power estimator is connected to the phase rotator and has a plurality of sub-power estimators to perform a power estimation on the rotated QAM symbol in each sub-carrier to thereby generate a signal power index and a noise power index. The channel gain calculator is connected to the phase rotator for generating a subcarrier channel gain signal and an averaged channel gain signal according to the rotated channel estimation signal. The average and selection device is connected to the power estimator and the channel gain calculator for selecting and generating an averaged signal power set, an averaged noise power set and an averaged channel gain set according to a criterion indicator, the signal power index, the noise power index and the subcarrier channel gain signal. The combination and calculation device is connected to the average and selection device and the channel gain calculator for generating an estimated SNR according to the criterion indicator, the averaged signal power set, the averaged noise power set and the averaged channel gain set.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
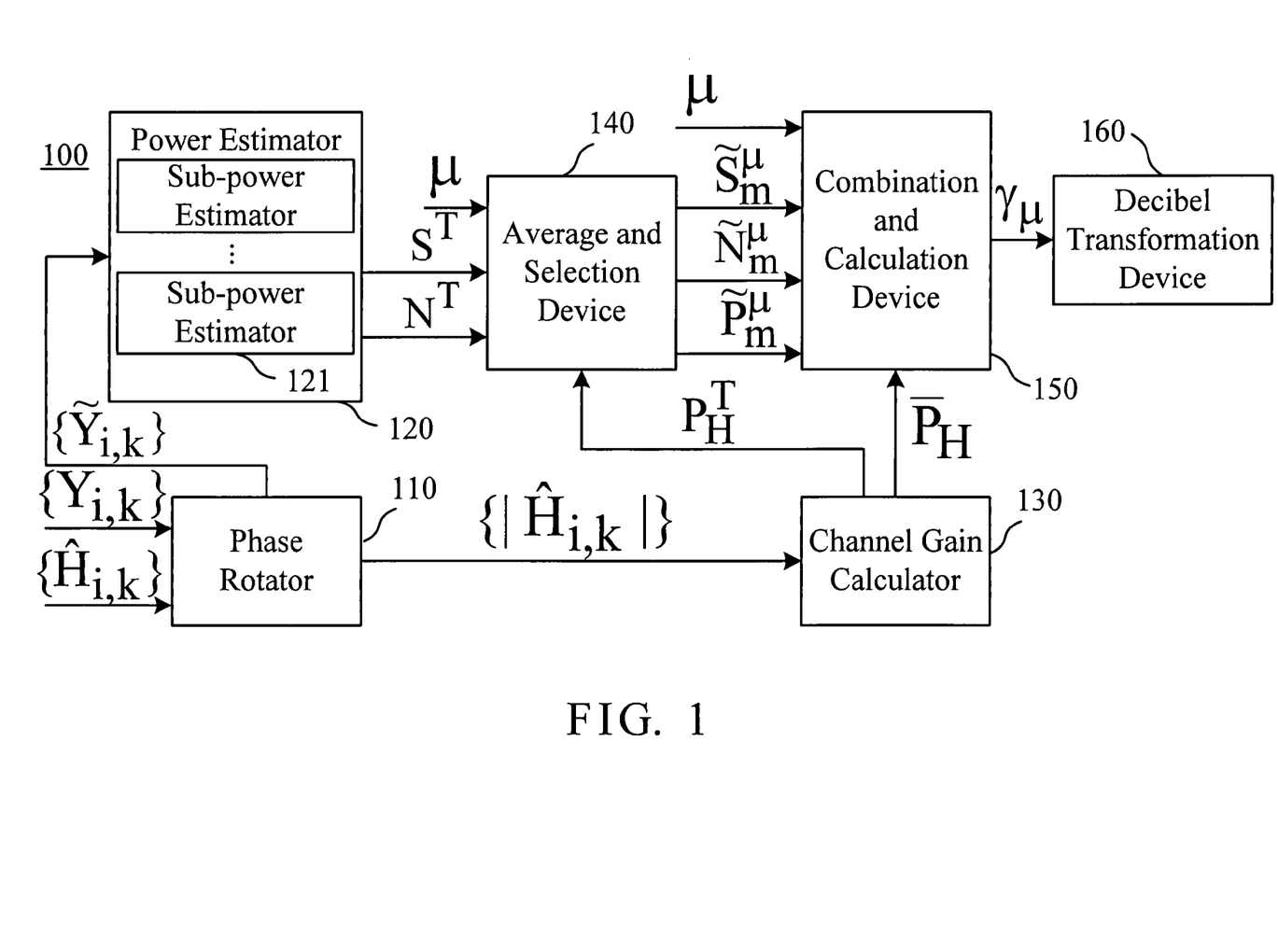
FIG. 1 is a schematic diagram of a signal to noise power ratio (SNR) estimation system for multi-carrier communication according to an embodiment of the invention, which is suitable for an orthogonal frequency division multiplexing (OFDM) based or a time domain synchronous-orthogonal frequency division multiplexing (TDS-OFDM) based multi-carrier system operated under a multi-path fading channel.

FIG. 1 is a schematic diagram of a signal to noise power ratio (SNR) estimation system 100 for multi-carrier communication according to an embodiment of the invention, which is suitable for an orthogonal frequency division multiplexing (OFDM) based or a time domain synchronous-orthogonal frequency division multiplexing (TDS-OFDM) based multi-carrier system operated under a multi-path fading channel. The SNR estimation system 100 of the present invention is described on the premise that the synchronization and the channel estimation required for the estimation system are completed in advance.

The estimation system 100 includes a phase rotator 110, a power estimator 120, a channel gain calculator 130, an average and selection device 140, a combination and calculation device 150, and a decibel (dB) transformation device 160.

Denote frame index by 'i' and sub-carrier index by 'k'. The phase rotator 110 receives the QAM symbols $\{Y_{i,k}\}$ and the channel estimation signals $\{\hat{H}_{i,k}\}$ and performs a phase rotation on the symbols and signals to thereby generate rotated QAM symbols $\{\tilde{Y}_{i,k}\}$ and rotated channel estimation signals $\{|\hat{H}_{i,k}|\}$.

Let $H_{i,k}=|H_{i,k}|\cdot e^{j\angle H_{i,k}}$, and if a perfect channel estimation makes $\hat{H}_{i,k}=H_{i,k}$, the phase rotator 110 rotates the QAM symbols $\{Y_{i,k}\}$ and the channel estimation signals $\{\hat{H}_{i,k}\}$ respectively by $-\angle H_{i,k}$ to thereby generate the rotated QAM symbols $\{\tilde{Y}_{i,k}\}$ and the rotated channel estimation signals $\{|\hat{H}_{i,k}|\}$. Consequently, the rotated QAM symbols $\{\tilde{Y}_{i,k}\}$ can be expressed as:

$$\tilde{Y}_{i,k}=Y_{i,k}\cdot e^{-j\angle H_{i,k}},$$

and the rotated channel estimation signals $\{|\hat{H}_{i,k}|\}$ can be expressed as:

$$\tilde{H}_{i,k}=H_{i,k}\cdot e^{-j\angle H_{i,k}}=|H_{i,k}|,$$

where $\{Y_{i,k}\}$ denotes a sequence at frequency domain after taking fast Fourier transform (FFT) on the QAM symbol sequence $\{y_{i,n}\}$ and 'n' denotes symbol index of the QAM symbol sequence $\{y_{i,n}\}$ at time domain.

The power estimator 120 is connected to the phase rotator 110 and has $N_{TPS}$ sub-power estimators 121 to perform a power estimation on the rotated QAM symbol $\{\tilde{Y}_{i,k}\}$ in each sub-carrier to thereby generate a signal power index $S^T$ and a noise power index $N^T$.

Figure 2:
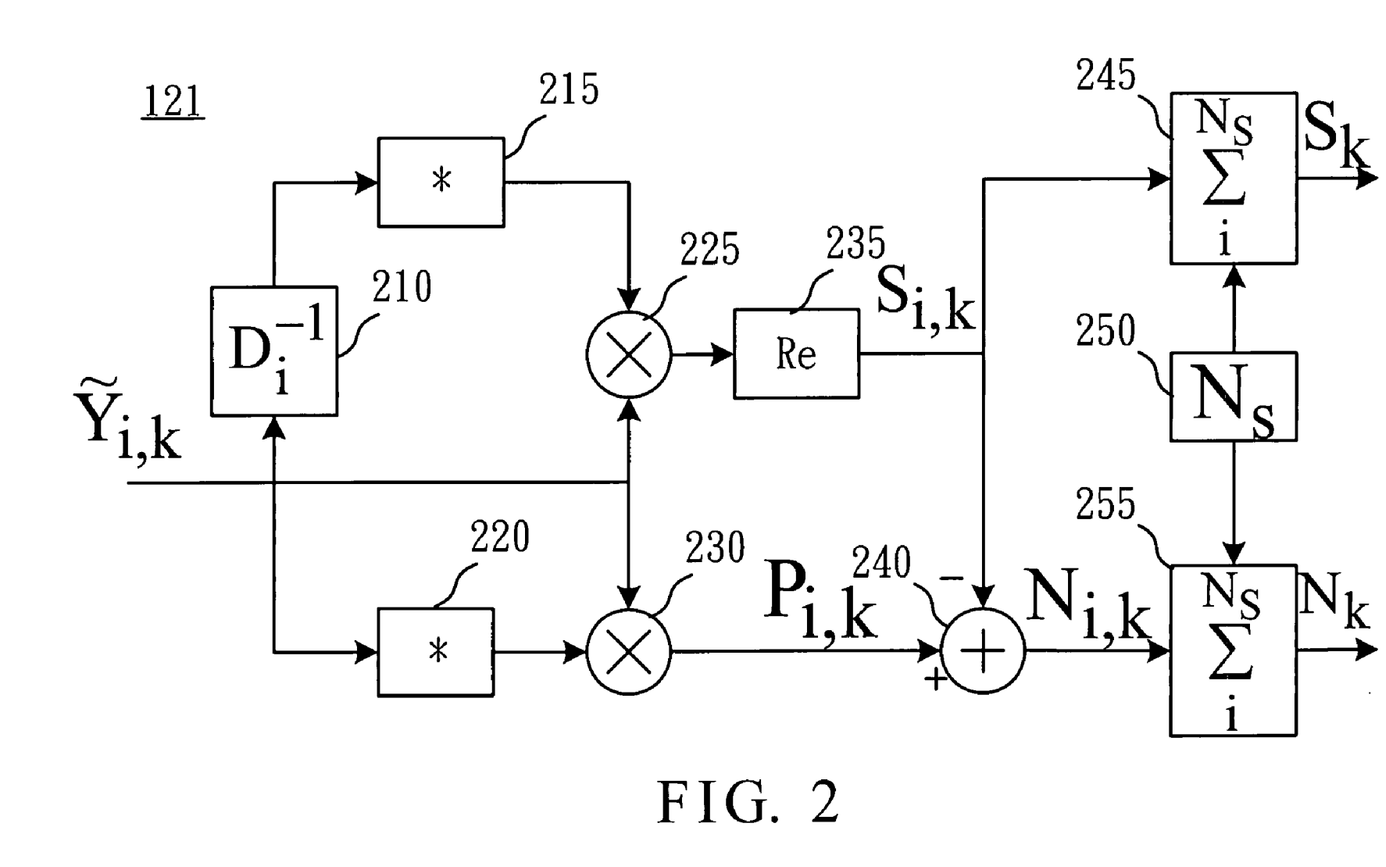
FIG. 2 is a block diagram of a sub-power estimator according to an embodiment of the invention.

FIG. 2 is a block diagram of a sub-power estimator 121 according to an embodiment of the invention. In FIG. 2, each of the sub-power estimators 121 is a correlative power estimator which receives the rotated QAM symbol $\tilde{Y}_{i,k}$ and generates a sub-carrier signal power index $S_k$ and noise power index $N_k$ corresponding to the sub-power estimator. As shown in FIG. 2, the sub-power estimator 121 has a delay device 210, two complex number generators 215 and 220, two multipliers 225 and 230, a real number generator 235, a subtractor 240, a register 250, and two accumulators 245 and 255.

The delay device 210 receives and temporarily stores $\tilde{Y}_{i,k}$. The complex number generator 215 is connected to the delay device 210 in order to calculate the complex conjugate of the $\tilde{Y}_{i,k}$ temporarily stored. The multiplier 225 multiplies the complex part by $\tilde{Y}_{i,k}$ to thereby generate a product, and the real number generator 235 extracts a real part from the product to thereby generate a signal $S_{i,k}$.

Similarly, the complex number generator 220 calculates the complex conjugate of the $\tilde{Y}_{i,k}$. The multiplier 230 multiplies the complex part by $\tilde{Y}_{i,k}$ to thereby generate a signal $P_{i,k}$. The signal $P_{i,k}$ is regarded as the total power on a k-th sub-carrier while the signal $S_{i,k}$ is regarded as the signal power on the k-th sub-carrier. Accordingly, the subtractor 240 can obtain a signal $N_{i,k}$ regarded as the noise power on the k-th sub-carrier by subtracting the signal $S_{i,k}$ from the signal $P_{i,k}$.

The register 250 temporarily stores a frame number $N_s$ to be accumulated. The accumulators 245 and 255 accumulate the signals $S_{i,k}$ and the signals $N_{i,k}$ to thereby generate the signal power index $S_k$ and noise power index $N_k$ respectively. The signal power index $S_k$ and noise power index $N_k$ correspond to the k-th sub-carrier.

The power estimator 120 has $N_{TPS}$ sub-power estimators 121. The signal power index $S^T$ and the noise power index $N^T$ are obtained by collecting the signal power index $S_k$ and the noise power index $N_k$ out of each sub-power estimator 121.

Figure 3:
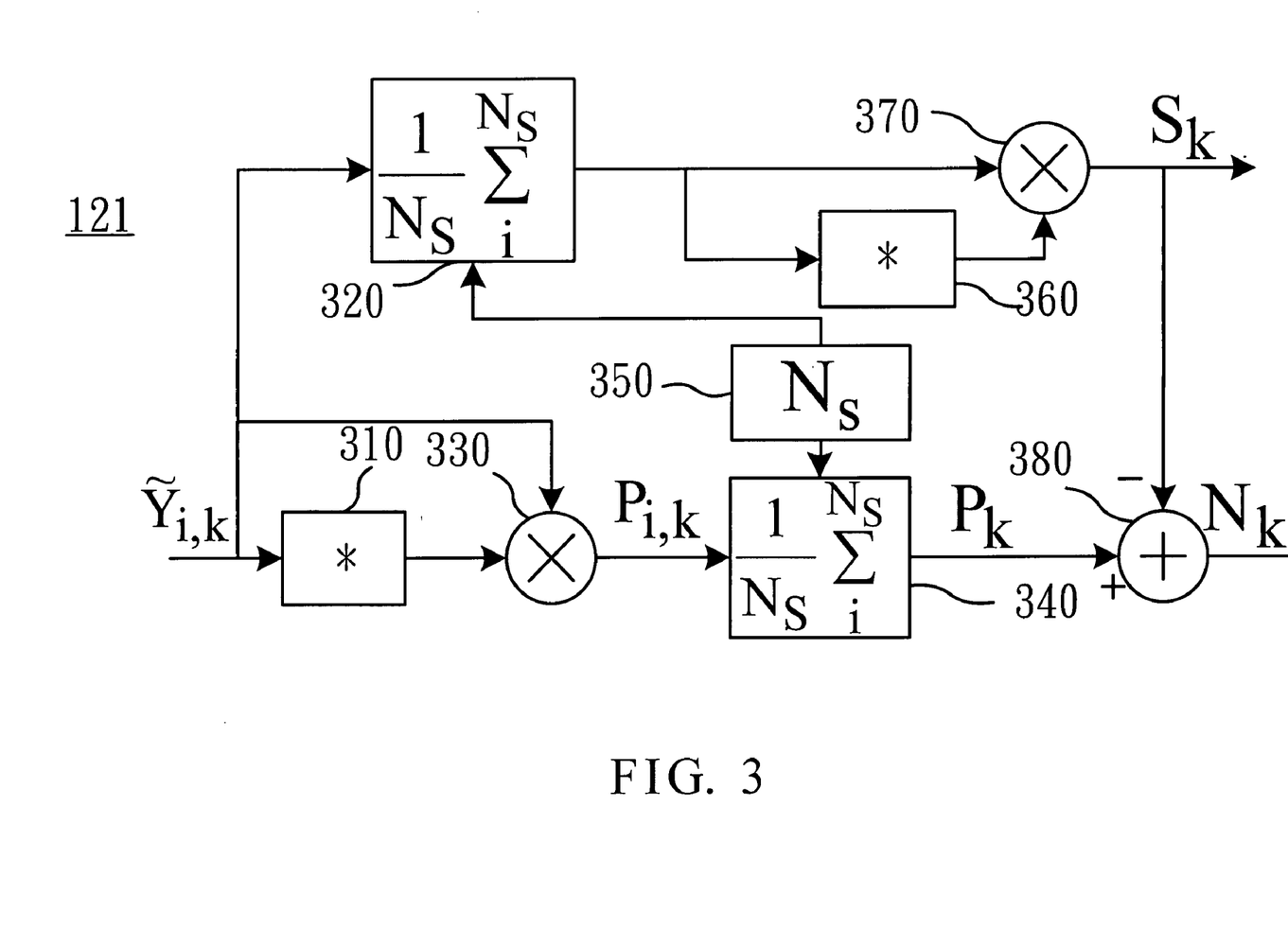
FIG. 3 is a block diagram of another sub-power estimator according to an embodiment of the invention.

FIG. 3 is a block diagram of another sub-power estimator 121 according to an embodiment of the invention. In FIG. 3, each sub-power estimator 121 is a time-averaged power estimator which receives $\tilde{Y}_{i,k}$ of the rotated QAM symbols $\{\tilde{Y}_{i,k}\}$ to thereby generate a sub-carrier signal power index $S_k$ and a sub-carrier noise power index $N_k$ on a sub-carrier. As shown in FIG. 3, the sub-power estimator 121 has two complex number generators 310 and 360, two accumulators 320 and 340, two multipliers 330 and 370, a subtractor 380 and a register 350.

The complex number generator 310 receives $\tilde{Y}_{i,k}$ and calculates its complex conjugate. Next, the multiplier 330 multiplies $\tilde{Y}_{i,k}$ and its complex conjugate to thereby generate $P_{i,k}$. The signal $P_{i,k}$ is regarded as the total power on a k-th sub-carrier. The register 350 temporarily stores a frame number $N_s$ to be accumulated. The accumulator 340 accumulates the signal $P_{i,k}$ over i to thereby generate the signal $P_k$.

The accumulator 340 accumulates $\tilde{Y}_{i,k}$ over i to thereby generate an output signal. The complex number generator 360 is connected to the accumulator 340 in order to calculate complex conjugate from the output signal of the accumulator 340 to thereby generate an output signal. The multiplier 370 is connected to the accumulator 340 and the complex number generator 360 in order to multiply the output signal of the accumulator 340 by the output signal of the complex number generator 360, so as to generate the signal power index $S_k$. The subtractor 380 subtracts the signal $S_k$ from the signal $P_k$ to thereby generate the noise power index $N_k$.

The power estimator 120 has $N_{TPS}$ sub-power estimators 121. The signal power index $S^T$ and the noise power index $N^T$ are obtained by collecting the signal power index $S_k$ and the noise power index $N_k$ out of each sub-power estimator 121.

The channel gain calculator 130 is connected to the phase rotator 110 in order to generate a sub-carrier channel gain signal $P_H^T$ and an averaged channel gain signal $\overline{P}_H$ according to the rotated channel estimation signal $\{|\hat{H}_{i,k}|\}$.

Figure 4:
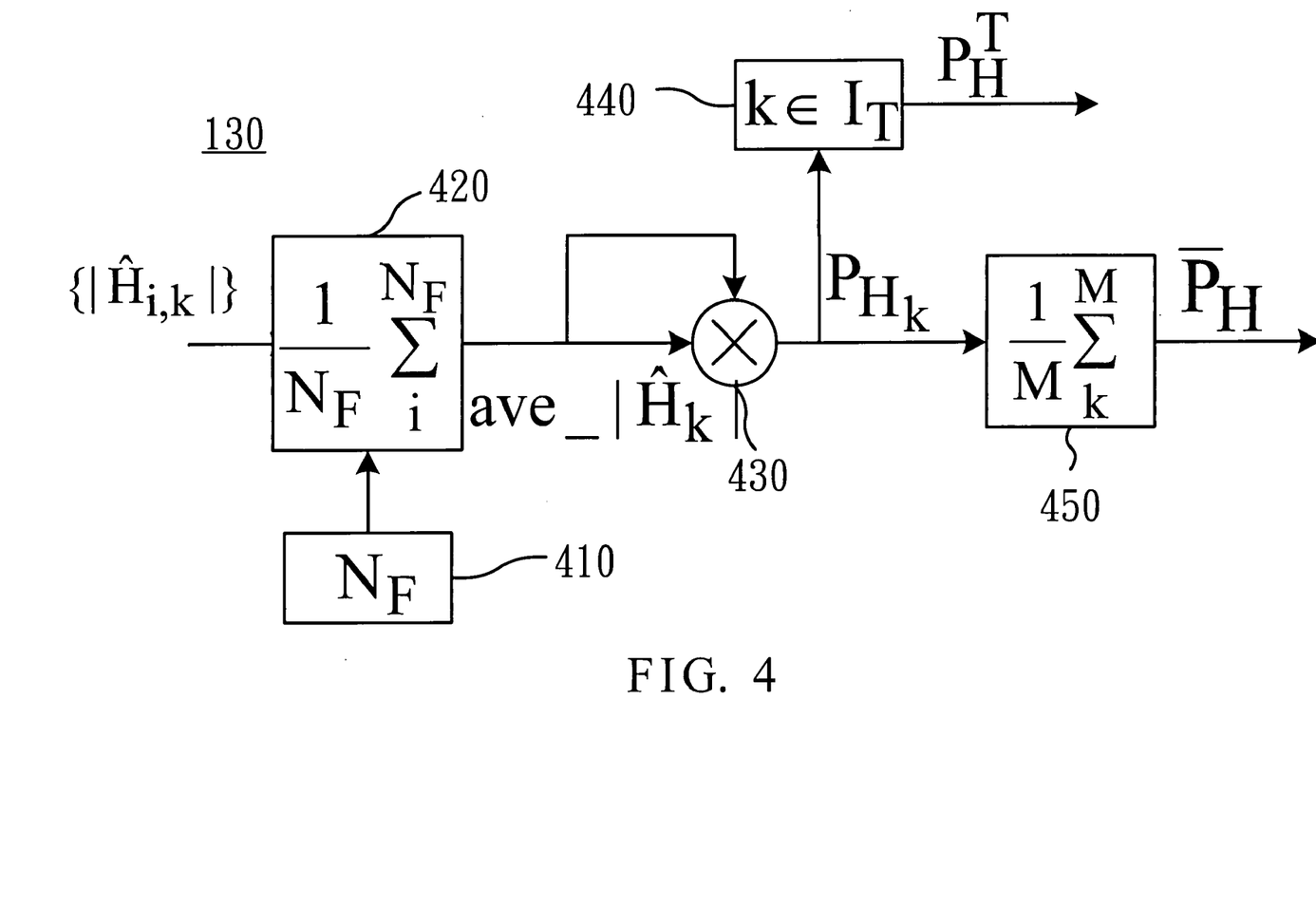
FIG. 4 is a block diagram of a channel gain calculator according to an embodiment of the invention.

FIG. 4 is a block diagram of the channel gain calculator 130 according to an embodiment of the invention. The channel gain calculator 130 has a register 410, a first accumulator 420, a first multiplier 430, a first selector 440 and a second accumulator 450.

The register 410 stores a frame number $N_F$. The first accumulator 420 is connected to the register 410 and the phase rotator 110 in order to accumulate the rotated channel estimation signal $\{|\hat{H}_{i,k}|\}$ over i to thereby generate an accumulated rotation channel signal ave_$|\hat{H}_{i,k}|$.

The first multiplier 430 is connected to the first accumulator 420 in order to multiply the accumulated rotation channel signal ave_$|\hat{H}_{i,k}|$ to thereby generate a k-th sub-carrier channel gain $P_{H_k}$.

The first selector 440 is connected to the first multiplier 430 in order to select a corresponding TPS or pilot channel gain as the sub-carrier channel gain signal $P_H^T$.

The second accumulator 450 is connected to the first multiplier 430 in order to accumulate all sub-carrier channel gains $P_{H_k}$ over k to thereby generate the averaged channel gain signal $\overline{P}_H$.

The k-th sub-carrier channel gain $P_{H_k}$ can be expressed as:

$$P_{H_k}=((1/N_F)\Sigma_i^{N_F}|H_{i,k}|)^2.$$

The averaged channel gain signal $\overline{P}_H$ can be expressed as:

$$\overline{P}_H=(1/M)\Sigma_{k=1}^M P_{H_k}.$$

The sub-carrier channel gain signal $P_H^T$ can be expressed as:

$$P_H^T \equiv \{P_{H_k}|k\in I_T\},$$

where $I_T$ indicates a sub-carrier set including all TPS or pilot indexes.

The average and selection device 140 is connected to the power estimator 120 and the channel gain calculator 130 in order to select and generate an averaged signal power set $\{\tilde{S}_m^\mu\}$, an averaged noise power set $\{\tilde{N}_m^\mu\}$ and an averaged channel gain set $\{\tilde{P}_m^\mu\}$ according to a criterion indicator $\mu$, the signal power index $S^T$, the noise power index $N^T$ and the sub-carrier channel gain signal $P_H^T$.

Figure 5:
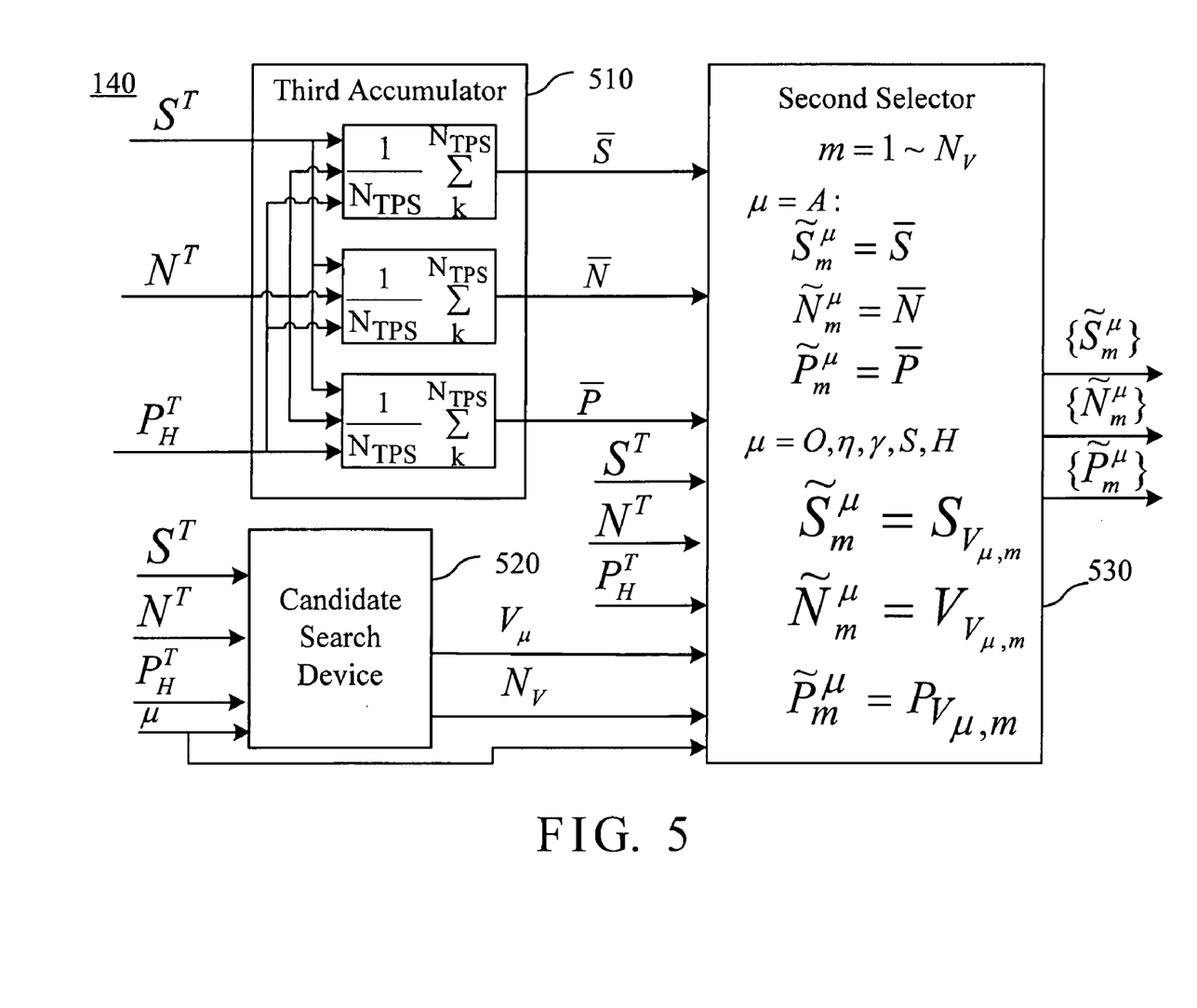
FIG. 5 is a block diagram of an average and selection device according to an embodiment of the invention.

FIG. 5 is a block diagram of the average and selection device 140 according to an embodiment of the invention. The average and selection device 140 has a third accumulator 510, a candidate search device 520 and a second selector 530.

The third accumulator 510 is connected to the power estimator 120 and the first selector 440 in order to accumulate the signal power index $S^T$, the noise power index $N^T$ and the sub-carrier channel gain signal $P_H^T$ respectively and generate an averaged signal power an average noise power $\overline{N}$ and an averaged channel gain $\overline{P}$. Namely, the third accumulator 510 has three sub-accumulators to perform an accumulation operation over $k \in I_T$ on the signal power index $S^T$, the noise power index $N^T$ and the sub-carrier channel gain signal $P_H^T$ respectively, and accordingly generates the averaged signal power $\overline{S}$, the averaged noise power $\overline{N}$ and the averaged channel gain $\overline{P}$.

The candidate search device 520 is connected to the power estimator 120 and the first selector 440 in order to search the signal power index $S^T$, the noise power index $N^T$ and the sub-carrier channel gain signal $P_H^T$ based on the criterion indicator μ for selecting a qualified sub-carrier index set $V_\mu$ with a number $N_V$.

Figure 6:
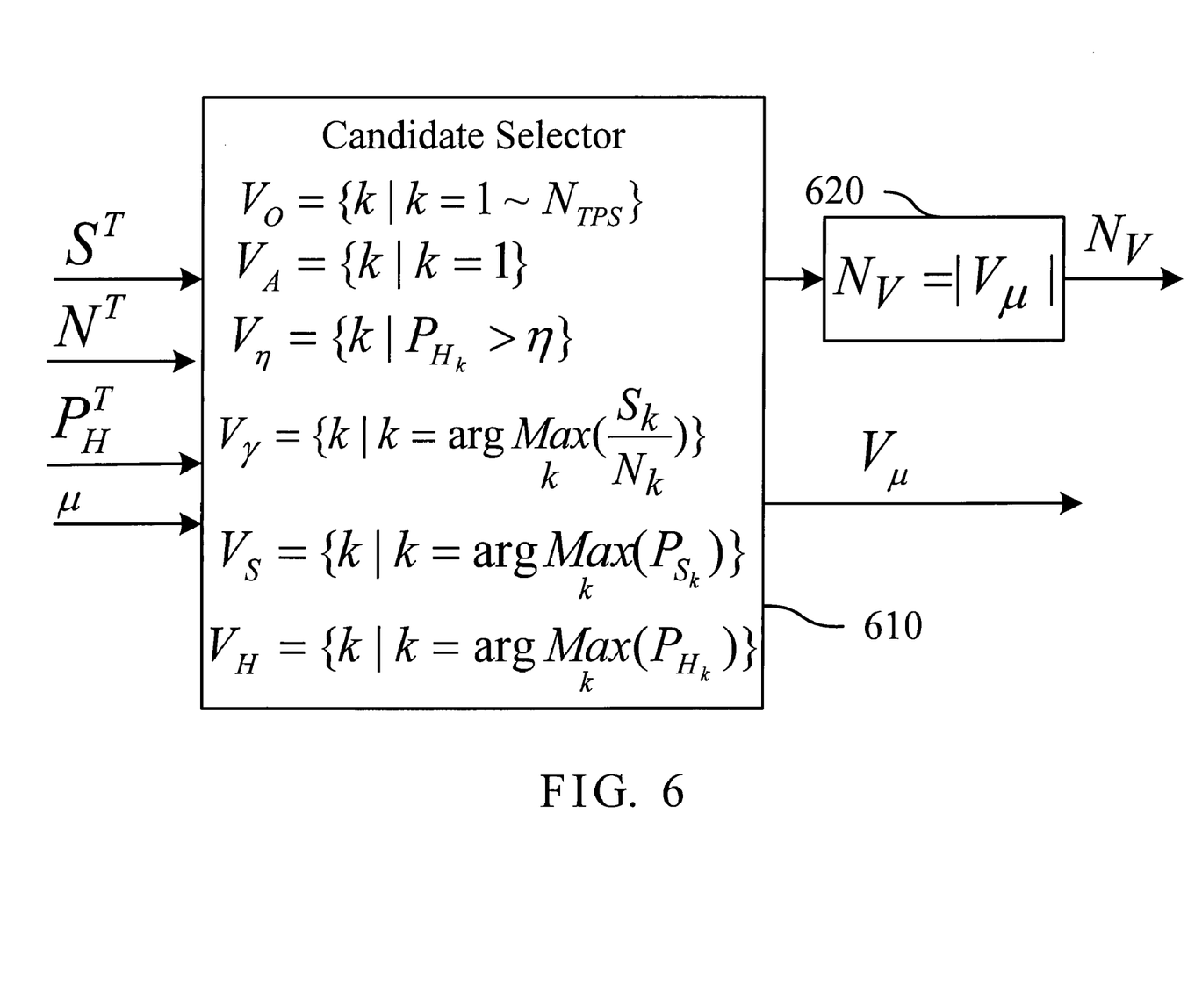
FIG. 6 is a block diagram of a candidate search device according to an embodiment of the invention.

FIG. 6 is a block diagram of the candidate search device 520 according to an embodiment of the invention. The candidate search device 520 has a candidate selector 610 and a counter 620.

As shown in FIG. 6, the subscript 'm' indicated in the averaged signal power set $\{\tilde{S}_m^\mu\}$, the averaged noise power set $\{\tilde{N}_m^\mu\}$ or the averaged channel gain set $\{\tilde{P}_m^\mu\}$ ranges from one to $N_V$. When the criterion indicator μ indicates an accumulation state A, the qualified sub-carrier index set $V_\mu$ out of the candidate selector 610 meets $V_A = \{k | k=1\}$. When the criterion indicator μ indicates an overall state O, the qualified sub-carrier index set $V_\mu$ out of the candidate selector 610 meets $V_O = \{k | k=1 \sim N_{TPS}\}$. When the criterion indicator μ indicates the k-th sub-carrier channel gain $P_{H_k}$ greater than a threshold η, the qualified sub-carrier index set $V_\mu$ out of the candidate selector 610 meets $V_\eta = \{k | P_{H_k} > \eta\}$. When the criterion indicator μ indicates a maximum of k-th sub-carrier SNR, the qualified sub-carrier index set $V_\mu$ out of the candidate selector 610 meets $$V_\eta = \left\{ k \,\bigg|\, \underset{k}{\mathrm{argMax}}\left(\frac{S_k}{N_k}\right) \right\}.$$

When the criterion indicator μ indicates a maximum of the k-th sub-carrier signal power, the qualified sub-carrier index set $V_\mu$ out of the candidate selector 610 meets $$V_S = \left\{ k \,\bigg|\, \underset{k}{\mathrm{argMax}}(P_{S_k}) \right\}.$$

When the criterion indicator μ indicates a maximum of the k-th sub-carrier channel gain, the qualified sub-carrier index set $V_\mu$ out of the candidate selector 610 meets $$V_H = \left\{ k \,\bigg|\, \underset{k}{\mathrm{argMax}}(P_{H_k}) \right\}.$$

The counter 620 is connected to the candidate selector 610 in order to calculate the number $N_V$ of all qualified sub-carrier index belong to $V_\mu$, i.e., $N_V = |V_\mu|$.

The second selector 530 is connected to the third accumulator 510 and the candidate search device 520 in order to select the averaged signal power set $\{\tilde{S}_m^\mu\}$, the averaged noise power set $\{\tilde{N}_m^\mu\}$ and the averaged channel gain set $\{\tilde{S}_m^\mu\}$ from the averaged signal power $\overline{S}$, the averaged noise power $\overline{N}$ and the averaged channel gain $\overline{P}$, respectively, according to the criterion indicator μ, the qualified sub-carrier index set $V_\mu$ and the number $N_V$.

The combination and calculation device 150 is connected to the average and selection device 140 and the channel gain calculator 130 in order to generate an estimated SNR $\gamma_\mu$ according to the criterion indicator μ, the averaged signal power set $\{\tilde{S}_m^\mu\}$, the averaged noise power set $\{\tilde{N}_m^\mu\}$, the averaged channel gain set $\{\tilde{P}_m^\mu\}$ and the averaged channel gain signal $\overline{P}_H$.

Figure 7:
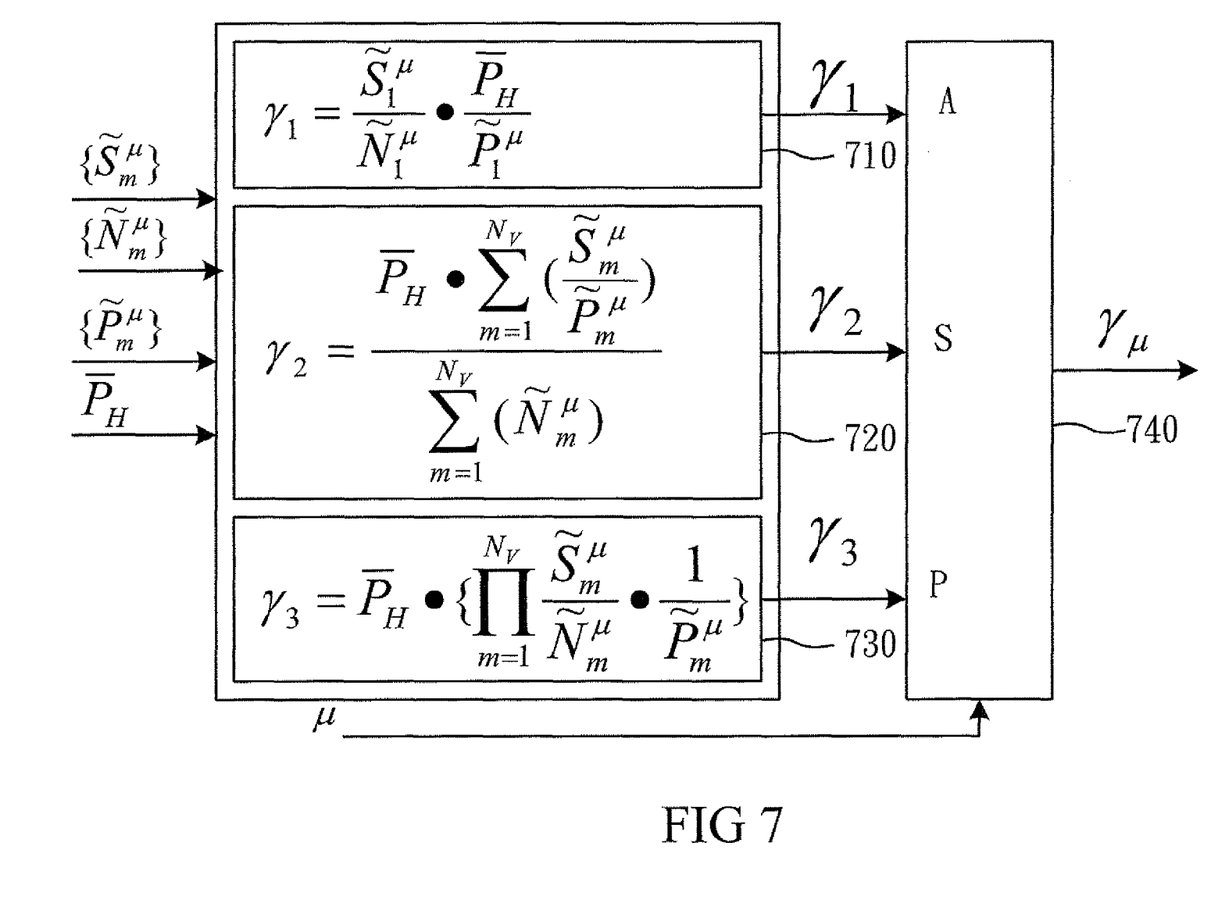
FIG. 7 is a block diagram of a combination and calculation device according to an embodiment of the invention.

FIG. 7 is a block diagram of the combination and calculation device 150 according to an embodiment of the invention. The combination and calculation device 150 has a first calculator 710, a second calculator 720, a third calculator 730 and a third selector 740.

The first calculator 710 is connected to the average and selection device 140 and the channel gain calculator 130 in order to generate a first estimated SNR according to the averaged signal power set $\{\tilde{S}_m^\mu\}$, the averaged noise power set $\{\tilde{N}_m^\mu\}$ and the averaged channel gain set $\{\tilde{P}_m^\mu\}$. The first calculator 710 finds the first estimated SNR based on equation (1):

$$\gamma_1 = \frac{\tilde{S}_1^\mu}{\tilde{N}_1^\mu} \cdot \frac{\overline{P}_H}{\tilde{P}_1^\mu}. \tag{1}$$

The second calculator 720 is connected to the average and selection device 140 and the channel gain calculator 130 in order to generate a second estimated SNR according to the averaged signal power set $\{\tilde{S}_m^\mu\}$, the averaged noise power set $\{\tilde{N}_m^\mu\}$, the averaged channel gain set $\{\tilde{P}_m^\mu\}$ and the averaged channel gain signal $\overline{P}_H$. The second calculator 720 finds the second estimated SNR based on equation (2):

$$\gamma_2 = \frac{\overline{P}_H \cdot \sum_{m=1}^{N_V}\left(\frac{\tilde{S}_m^\mu}{\tilde{P}_m^\mu}\right)}{\sum_{m=1}^{N_V}(\tilde{N}_m^\mu)}. \tag{2}$$

The third calculator 730 is connected to the average and selection device 140 and the channel gain calculator 130 in order to generate a third estimated SNR according to the averaged signal power set $\{\tilde{S}_m^\mu\}$, the averaged noise power set $\{\tilde{N}_m^\mu\}$, the averaged channel gain set $\{\tilde{P}_m^\mu\}$ and the averaged channel gain signal $\overline{P}_H$. The third calculator 730 finds the third estimated SNR based on equation (3):

$$\gamma_3 = \overline{P}_H \cdot \left\{ \prod_{m=1}^{N_V} \frac{\tilde{S}_m^\mu}{\tilde{N}_m^\mu} \cdot \frac{1}{\tilde{P}_m^\mu} \right\}. \tag{3}$$

The third selector 740 is connected to the first calculator 710, the second calculator 720 and the third calculator 730 in order to select the first estimated SNR, the second estimated SNR or the third estimated SNR as the estimated SNR $\gamma_\mu$ according to the criterion indicator μ.

The decibel (dB) transformation device is connected to the combination and calculation device 150 in order to change the estimated SNR $\gamma_\mu$ into a decibel value.

As cited, the SNR estimation system of the invention is used in a multi-path channel. When the SNR estimation system is applied in an AWGN channel, the estimated SNR $\gamma_\mu$ can be expressed as:

$$\gamma_\mu = \left\{ \prod_{m=1}^{N_V} \frac{\tilde{S}_m^\mu}{\tilde{N}_m^\mu} \right\}^{\frac{1}{N_V}}. \quad (4)$$

Figure 8:
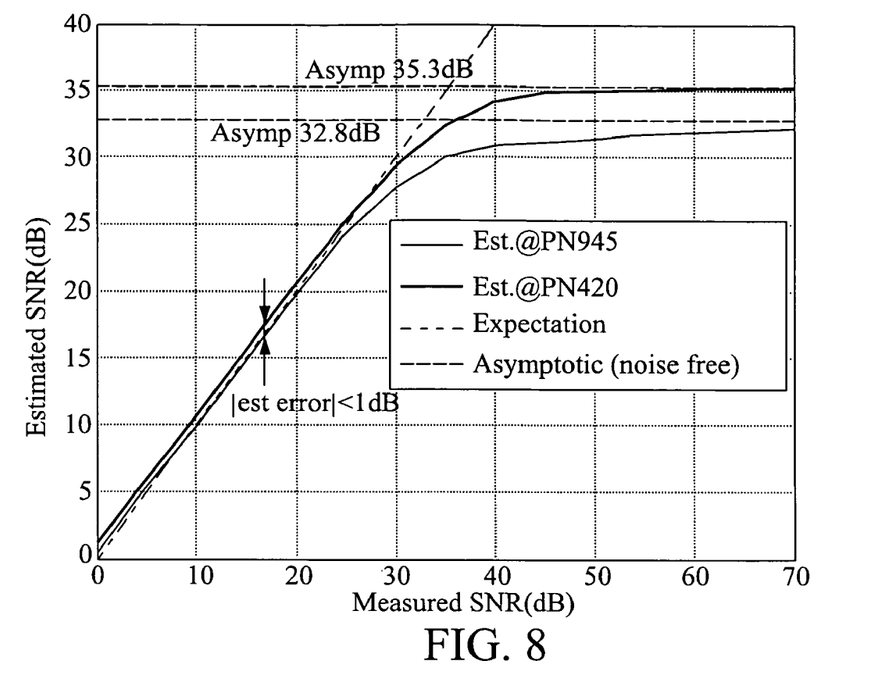
FIG. 8 is a schematic graph of an emulation of a unified blind TPS or pilot assisted SNR estimation system for a digital terrestrial multimedia broadcasting (DTMB) system according to an embodiment of the invention.

FIG. 8 is a schematic graph of an emulation of a unified blind TPS or pilot assisted SNR estimation system applied in a digital terrestrial multimedia broadcasting (DTMB) system as an example according to an embodiment of the invention. In this case, there are 36 pilots used in the AWGN channel, the correlative sub-power estimators in FIG. 2 are used, and the criterion indicator $\mu$ indicates an accumulation state ($\mu$=A). As shown in FIG. 8, for PN945 and PN420 modes and an SNR smaller than 22 dB, the difference between the estimated SNR and the measured SNR is smaller than 1 dB. Namely, the inventive estimated SNR is very close to the real SNR.

Figure 9:
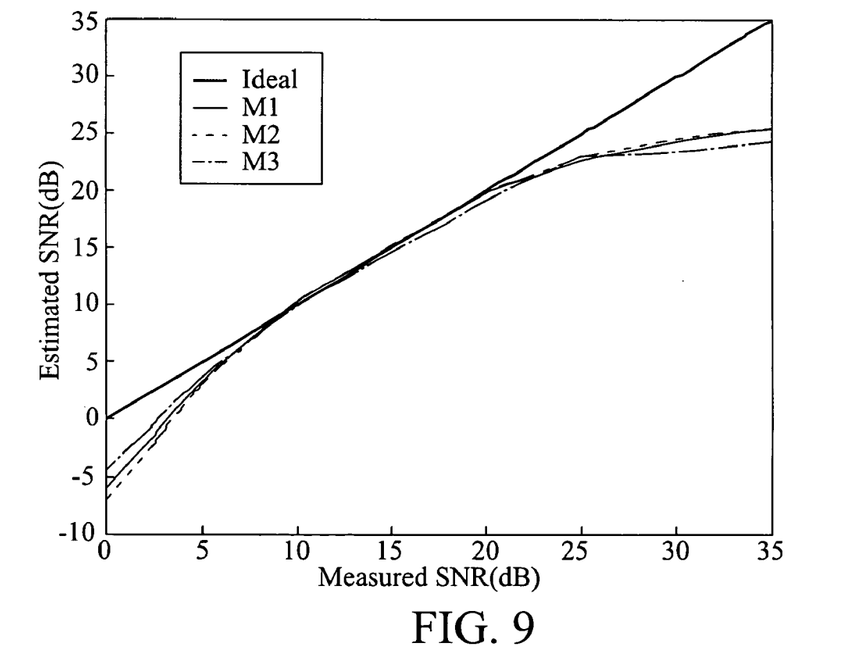
FIG. 9 is a schematic graph of another emulation of an SNR estimation system for multi-carrier communication according to an embodiment of the invention.
Figure 10:
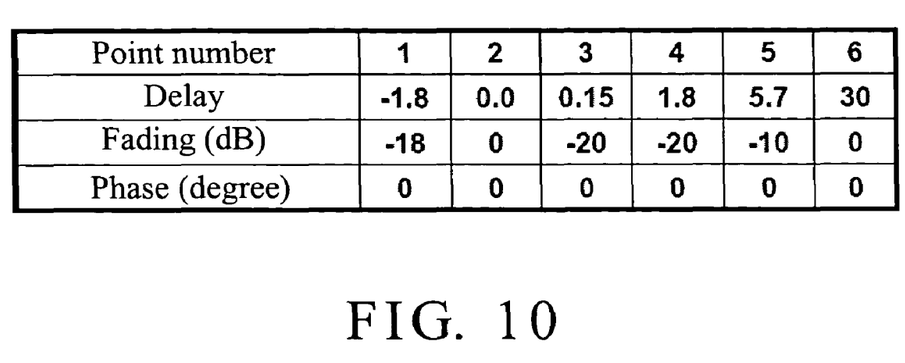
FIG. 10 is a parameter table of a SARFT-8 multi-path channel according to an embodiment of the invention.

FIG. 9 is a schematic graph of another emulation of a unified blind TPS or pilot assisted SNR estimation system applied in a digital terrestrial multimedia broadcasting (DTMB) system according to an embodiment of the invention. In this case, a SARFT-8 channel and a PN420/QPSK mode are used. As shown in FIG. 9, the M1 line is based on equation (3) under the correlative sub-power estimators 121 in FIG. 2, the M2 line is based on equation (3) under the time averaged sub-power estimators 121 in FIG. 3, and the M3 line is based on equation (1) under the correlative sub-power estimators in FIG. 2. FIG. 10 shows a table of parameters of a SARFT-8 (multi-path) channel according to an embodiment of the invention.

In view of the foregoing, it is known that the prior art does not use a TPS or pilot to help SNR estimation, and only considers an AWGN channel, without taking care of a multi-path channel in actual transmission. Thus, the invention utilizes TPS or pilot subcarriers to blindly assist in SNR estimation to accordingly gain an estimated SNR more accurate than the prior art, such that the communication system is calibrated to a preferred condition. Further, in addition to an AWGN channel, the invention considers a multi-path channel in actual transmission, such that the SNR in actual transmission can be estimated more accurate than the prior art.

Although the present invention has been explained in relation to its preferred embodiment, it is to be understood that many other possible modifications and variations can be made without departing from the spirit and scope of the invention as hereinafter claimed.

What is claimed is:

1. A signal to noise power ratio (SNR) estimation system for multi-carrier communication system, comprising:
 a phase rotator for receiving a quadrature amplitude modulation (QAM) symbol $\{Y_{i,k}\}$ and a channel estimation signal $\{H_{i,k}\}$ and performing a phase rotation on the symbol and signal to generate a rotated QAM symbol $\{\tilde{Y}_{i,k}\}$ and a rotated channel estimation signal $\{|\hat{H}_{i,k}|\}$, wherein i is a frame index and k is a sub-carrier index;
 a power estimator connected to the phase rotator and having $N_{TPS}$ sub-power estimators to perform a power estimation on the rotated QAM symbol $\{\tilde{Y}_{i,k}\}$ in each sub-carrier to generate a signal power index $S^T$ and a noise power index $N^T$, where $N_{TPS}$ is a positive integer;
 a channel gain calculator connected to the phase rotator for generating a subcarrier channel gain signal $P_H^T$ and an averaged channel gain signal $\bar{P}_H$ according to the rotated channel estimation signal $\{|\hat{H}_{i,k}|\}$;
 an average and selection device connected to the power estimator and the channel gain calculator for selecting and generating an averaged signal power set $\{\tilde{S}_m^\mu\}$, an averaged noise power set $\{\tilde{N}_m^\mu\}$ and an averaged channel gain set $\{\tilde{P}_m^\mu\}$ according to a criterion indicator $\mu$, the signal power index $S^T$, the noise power index $N^T$ and the subcarrier channel gain signal $P_H^T$; and
 a combination and calculation device connected to the average and selection device and the channel gain calculator for generating an estimated SNR $\gamma_\mu$ according to the criterion indicator $\mu$, the averaged signal power set $\{\tilde{S}_m^\mu\}$, the averaged noise power set $\{\tilde{N}_m^\mu\}$, the averaged channel gain set $\{\tilde{P}_m^\mu\}$ and the averaged channel gain signal $\bar{P}_H$.

2. The estimation system as claimed in claim 1, further comprising:
 a decibel (dB) transformation device connected to the combination and calculation device for changing the estimated SNR $\gamma_\mu$ into a decibel value.

3. The estimation system as claimed in claim 2, wherein the phase rotator rotates the QAM symbol $\{y_{i,k}\}$ and the channel estimation signal $\{\hat{H}_{i,k}\}$ respectively by a phase of $-\angle H_{i,k}$ to generate the rotated QAM symbol $\{\tilde{Y}_{i,k}\}$ and the rotated channel estimation signal $\{|\hat{H}_{i,k}|\}$.

4. The estimation system as claimed in claim 3, wherein the rotated QAM symbols $\{\tilde{Y}_{i,k}\}$ is expressed as:

$$\tilde{Y}_{i,k} = Y_{i,k} \cdot e^{-j\angle H_{i,k}},$$

and the rotated channel estimation signals $\{|\hat{H}_{i,k}|\}$ is expressed as:

$$\tilde{H}_{i,k} = H_{i,k} \cdot e^{-j\angle H_{i,k}} = |H_{i,k}|,$$

where $\tilde{Y}_{i,k}$ is a representation of the rotated QAM symbol $\{\tilde{Y}_{i,k}\}$ at frequency domain.

5. The estimation system as claimed in claim 4, wherein each of the sub-power estimators comprises a correlative power estimator.

6. The estimation system as claimed in claim 4, wherein each of the sub-power estimators comprises a time-averaged power estimator.

7. The estimation system as claimed in claim 4, wherein the channel gain calculator comprises:
 a register for storing a frame number $N_F$;
 a first accumulator connected to the register and the phase rotator for accumulating the rotated channel estimation signal $\{|\hat{H}_{i,k}|\}$ to generate an accumulated rotation channel signal ave_$|\tilde{H}_k|$;
 a first multiplier connected to the first accumulator for multiplying the accumulated rotation channel signal ave_$|\tilde{H}_k|$ to generate a k-th sub-carrier channel gain $P_{H_k}$;
 a first selector connected to the first multiplier for selecting a corresponding TPS or pilot channel gain as the sub-carrier channel gain signal $P_H^T$; and
 a second accumulator connected to the first multiplier for accumulating all sub-carrier channel gains $P_{H_k}$ to generate the averaged channel gain signal $\bar{P}_H$.

8. The estimation system as claimed in claim 7, wherein the k-th sub-carrier channel gain $P_{H_k}$ is expressed as:

$$P_{H_k} = ((1/N_F)\Sigma_i^{N_F}|H_{i,k}|)^2,$$

the averaged channel gain signal $\overline{P}_H$ is expressed as:

$$\overline{P}_H = (1/M)\Sigma_{k=1}^{M} P_{H_k},$$

where M is total number of active subcarriers in the multi-carrier communication system and the sub-carrier channel gain signal $P_H^T$ is expressed as:

$$P_H^T \equiv \{P_{H_k} | k \in I_T\},$$

where $I_T$ indicates a sub-carrier set that collects TPS or pilot indexes.

9. The estimation system as claimed in claim 8, wherein the average and selection device comprises:

a third accumulator connected to the power estimator and the first selector for accumulating the signal power index $S^T$, the noise power index $N^T$ and the sub-carrier channel gain signal $P_H^T$ and generating an averaged signal power $\overline{S}$, an averaged noise power $\overline{N}$ and an averaged channel gain $\overline{P}$ respectively;

a candidate search device connected to the power estimator and the first selector for searching the signal power index $S^T$, the noise power index $N^T$ and the sub-carrier channel gain signal $P_H^T$ according to the criterion indicator $\mu$, so as to select a qualified sub-carrier index set $V_\mu$ with a number $N_V$; and a second selector connected to the third accumulator and the candidate search device for selecting the averaged signal power set $\{\tilde{S}_m^\mu\}$, the averaged noise power set $\{\tilde{N}_m^\mu\}$ and the averaged channel gain set $\{\tilde{P}_m^\mu\}$ from the averaged signal power $\overline{S}$, the averaged noise power $\overline{N}$ and the averaged channel gain $\overline{P}$, respectively, according to the criterion indicator $\mu$, the qualified sub-carrier index set $V_\mu$ and the number $N_V$.

10. The estimation system as claimed in claim 9, wherein a subscript m in the averaged signal power set $\{\tilde{S}_m^\mu\}$, the averaged noise power set $\{\tilde{N}_m^\mu\}$ or the averaged channel gain set $\{\tilde{P}_m^\mu\}$ ranges from one to $N_V$.

11. The estimation system as claimed in claim 10, wherein the qualified sub-carrier index set $V_\mu$ out of the candidate selector meets $V_A = \{k | k=1\}$ when the criterion indicator $\mu$ indicates an accumulation state.

12. The estimation system as claimed in claim 11, wherein the qualified sub-carrier index set $V_\mu$ out of the candidate selector meets $V_O = \{k | k=1 \sim N_{TPS}\}$ when the criterion indicator $\mu$ indicates an overall state.

13. The estimation system as claimed in claim 12, wherein the qualified sub-carrier index set $V_\mu$ out of the candidate selector meets $V_\eta = \{k | P_{H_k} > \eta\}$ when the criterion indicator $\mu$ indicates the k-th sub-carrier channel gain $P_{H_k}$ which is greater than a threshold $\eta$.

14. The estimation system as claimed in claim 13, wherein the qualified sub-carrier index set $V_\mu$ out of the candidate selector meets $$V_\eta = \left\{ k \,\bigg|\, \mathrm{arg}\underset{k}{\mathrm{Max}}\left(\frac{S_k}{N_k}\right) \right\}$$

when the criterion indicator $\mu$ indicates a maximum of k-th sub-carrier SNR.

15. The estimation system as claimed in claim 14, wherein the qualified sub-carrier index set $V_\mu$ out of the candidate selector meets $$V_S = \left\{ k \,\bigg|\, \mathrm{arg}\underset{k}{\mathrm{Max}}(P_{S_k}) \right\}$$

when the criterion indicator $\mu$ indicates a maximum of k-th sub-carrier signal power.

16. The estimation system as claimed in claim 15, wherein the qualified sub-carrier index set $V_\mu$ out of the candidate selector meets $$V_H = \left\{ k \,\bigg|\, \mathrm{arg}\underset{k}{\mathrm{Max}}(P_{H_k}) \right\}$$

when the criterion indicator $\mu$ a indicates a maximum of the k-th sub-carrier channel gain.

17. The estimation system as claimed in claim 16, wherein the combination and calculation device comprises:

a first calculator connected to the average and selection device and the channel gain calculator for generating a first estimated SNR according to the averaged signal power set $\{\tilde{S}_m^\mu\}$, the averaged noise power set $\{\tilde{N}_m^\mu\}$ and the averaged channel gain set $\{\tilde{P}_m^\mu\}$;

a second calculator connected to the average and selection device and the channel gain calculator for generating a second estimated SNR according to the averaged signal power set $\{\tilde{S}_m^\mu\}$, the averaged noise power set $\{\tilde{N}_m^\mu\}$, the averaged channel gain set $\{\tilde{P}_m^\mu\}$ and the averaged channel gain signal $\overline{P}_H$;

a third calculator connected to the average and selection device and the channel gain calculator for generating a third estimated SNR according to the averaged signal power set $\{\tilde{S}_m^\mu\}$, the averaged noise power set $\{\tilde{N}_m^\mu\}$, the averaged channel gain set $\{\tilde{P}_m^\mu\}$ and the averaged channel gain signal $\overline{P}_H$; and a third selector connected to the first calculator, the second calculator and the third calculator for selecting the first estimated SNR, the second estimated SNR or the third estimated SNR as the final estimated SNR $\gamma_\mu$ according to the criterion indicator $\mu$.

18. The estimation system as claimed in claim 17, wherein the first calculator finds the first estimated SNR based on an equation as follows:

$$\gamma_1 = \frac{\tilde{S}_1^\mu}{\tilde{N}_1^\mu} \cdot \frac{\overline{P}_H}{\tilde{P}_1^\mu}.$$

19. The estimation system as claimed in claim 18, wherein the second calculator finds the second estimated SNR based on an equation as follows:

$$\gamma_2 = \frac{\overline{P}_H \cdot \sum_{m=1}^{N_V}\left(\frac{\tilde{S}_m^\mu}{\tilde{P}_m^\mu}\right)}{\sum_{m=1}^{N_V}(\tilde{N}_m^\mu)}.$$

20. The estimation system as claimed in claim 19, wherein the third calculator finds the third estimated SNR based on an equation as follows:

$$\gamma_3 = \bar{P}_H \cdot \left\{ \prod_{m=1}^{N_V} \frac{\tilde{S}_m^\mu}{\tilde{N}_m^\mu} \cdot \frac{1}{\tilde{P}_m^\mu} \right\}.$$

21. The estimation system as claimed in claim 19, wherein the estimated SNR $\gamma_\mu$ for an AWGN channel is expressed as:

$$\gamma_\mu = \left\{ \prod_{m=1}^{N_V} \frac{\tilde{S}_m^\mu}{\tilde{N}_m^\mu} \right\}^{\frac{1}{N_V}}.$$

* * * * *